US 8,560,461 B1

(12) United States Patent
Tian et al.

(10) Patent No.: US 8,560,461 B1
(45) Date of Patent: Oct. 15, 2013

(54) SHIPMENT SPLITTING ANALYZER

(75) Inventors: Hong Tian, Seattle, WA (US); Ritesh R. Garodia, Bellevue, WA (US); Eric C. Young, Mercer Island, WA (US); Devesh Mishra, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 960 days.

(21) Appl. No.: 12/059,601

(22) Filed: Mar. 31, 2008

(51) Int. Cl.
G06Q 30/00 (2012.01)

(52) U.S. Cl.
USPC .......................................... 705/332

(58) Field of Classification Search
USPC ........................................... 705/332
See application file for complete search history.

(56) References Cited

U.S. PATENT DOCUMENTS

| 5,322,181 | A | * | 6/1994 | Nelson ......................... 229/87.2 |
| 6,115,690 | A | * | 9/2000 | Wong ........................... 705/7.27 |
| 6,564,927 | B2 | * | 5/2003 | Meyer ........................... 198/528 |
| 2002/0133387 | A1 | | 9/2002 | Wilson et al. |
| 2003/0060924 | A1 | | 3/2003 | Ye et al. |
| 2003/0093388 | A1 | | 5/2003 | Albright et al. |
| 2003/0200111 | A1 | * | 10/2003 | Damji ............................. 705/1 |
| 2004/0243277 | A1 | * | 12/2004 | Bonnain et al. ................ 700/213 |
| 2004/0267675 | A1 | * | 12/2004 | Burton et al. ................. 705/400 |
| 2007/0177954 | A1 | * | 8/2007 | Kootstra et al. ................. 410/44 |
| 2007/0186515 | A1 | * | 8/2007 | Ruetten et al. ................... 53/502 |
| 2008/0308452 | A1 | * | 12/2008 | Eller ............................. 206/756 |

OTHER PUBLICATIONS

Leckey, Andrew, "Home Sweet Office Take These Guidelines Into Consideration Before You Decide to Work From Your House," Chicago Tribune, North Sports Final, C Edition, Chicago, Illinois, Feb. 9, 1995, p. 7.*

Dilger, Karen Abramic, "Everyone Wants In," Manufacturing Systems, 16, 7, Jul. 1998, pp. 108-142.*

* cited by examiner

*Primary Examiner* — Nathan Erb
(74) *Attorney, Agent, or Firm* — Robert C. Kowert; Meyertons, Hood, Kivlin, Kowert & Goetzel, P.C.

(57) ABSTRACT

A system and computer-implemented method for automatically splitting a group of items into two or more shipment sets are disclosed. A shipment splitting analyzer may be configured to determine if and how the items should be split into shipment sets dependent on the number of unique or total items, item parameters, container parameters, facility configurations, transportation constraints, and/or business policies. Items may be dequeued from the group into proposed shipment sets directed to a target container. The shipment splitting analyzer may determine which items may be shipped together dependent on a cumulative volume and/or weight of the items, a size and/or weight capacity of the target container, and/or affinity information associated with the items. Oversized items, over-weight items, and/or large quantities of single items may be removed for exception processing prior to splitting the items into shipment sets. Shipment splitting data may be analyzed for current performance and/or operational trends.

40 Claims, 8 Drawing Sheets

| order identifier 600 | |
|---|---|
| item identifier 620a | item quantity 630a |
| item identifier 620b | item quantity 630b |
| item identifier 620c | item quantity 630c |
| item identifier 620d | item quantity 630d |
| item identifier 620e | item quantity 630e |
| item identifier 620f | item quantity 630f |
| item identifier 620g | item quantity 630g |
| item identifier 620h | item quantity 630h |
| item identifier 620i | item quantity 630i |
| item identifier 620j | item quantity 630j |
| item identifier 620k | item quantity 630k |
| item identifier 620l | item quantity 630l |
| item identifier 620m | item quantity 630m |
| item identifier 620n | item quantity 630n |
| item identifier 620o | item quantity 630o |

*FIG. 6A*

| order identifier 600 | |
|---|---|
| item identifier 620a | item quantity 630a |
| item identifier 620b | item quantity 630b |
| item identifier 620f | item quantity 630f |
| item identifier 620g | item quantity 630g |
| item identifier 620i | item quantity 630i |
| item identifier 620j | item quantity 630j |
| item identifier 620c | item quantity 630c |
| item identifier 620d | item quantity 630d |
| item identifier 620e | item quantity 630e |
| item identifier 620h | item quantity 630h |
| item identifier 620k | item quantity 630k |
| item identifier 620l | item quantity 630l |
| item identifier 620m | item quantity 630m |
| item identifier 620n | item quantity 630n |
| item identifier 620o | item quantity 630o |

*FIG. 6B*

| order identifier 600 | |
|---|---|
| shipment identifier 610a | |
| item identifier 620a | item quantity 630a |
| item identifier 620b | item quantity 630b |
| item identifier 620f | item quantity 630f |
| item identifier 620g | item quantity 630g |
| item identifier 620i | item quantity 630i |
| item identifier 620j | item quantity 630j |

FIG. 6C

| order identifier 600 | |
|---|---|
| shipment identifier 610b | |
| item identifier 620c | item quantity 630c |
| item identifier 620d | item quantity 630d |
| item identifier 620e | item quantity 630e |
| item identifier 620h | item quantity 630h |
| item identifier 620k | item quantity 630k |
| item identifier 620l | item quantity 630l |
| item identifier 620m | item quantity 630m |
| item identifier 620n | item quantity 630n |
| item identifier 620o | item quantity 631o |

FIG. 6D

| order identifier 600 | |
|---|---|
| shipment identifier 610c | |
| item identifier 620o | item quantity 632o |

FIG. 6E

| order identifier 600 | |
|---|---|
| shipment identifier 610d | |
| item identifier 620o | item quantity 633o |

FIG. 6F

SHIPMENT SPLITTING ANALYZER

BACKGROUND

Many companies package groups of items together for a variety of purposes, such as e-commerce and mail order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

A common concern with such groups of items, referred to herein as "item packages," involves ensuring that appropriate containers are used for shipping them, both to minimize costs and to protect the item contents. An agent may select a container based on a visual assessment of the items once they are grouped. Using this method, the agent may not be able to select an appropriate container until all of the items in the group have been collected. This visual method of selecting containers may be prone to human error, as an agent may select a container that is too small or that is larger than it needs to be to handle the items. This may result in higher costs associated with using an inappropriate container or in additional costs associated with re-work, in the case that an agent must re-package the items and/or split the group of items into two or more containers for shipping. For example, shipping a group of items in a box that is larger than necessary may result in a higher shipping cost than shipping the same items in a smaller box, due to the cost of the box and/or any higher fees associated with shipping larger or heavier boxes. Similarly, shipping items in a box that is larger than necessary, or not filling each box to capacity, may waste valuable (and expensive) transportation space (e.g., space in a truck or in a shipping container that will be placed on a train or an airplane). In another example, attempting to pack too many items in a box that is too small for the items may damage the item and/or may result in re-work if some of the items must be taken out of one box and re-packaged in another box, splitting the item group into two or more smaller item groups to be shipped in separate boxes. In addition, manually singling out item groups for repacking or other exception handling may increase labor costs and decrease cycle time for fulfilling customer orders. The excess costs associated with shipping item packages in inappropriate containers, and/or with exception processing and re-work may significantly reduce profit margins in some materials handling facilities.

Shipments that include large quantities of items and/or unusually large items can be difficult for a materials handling facility to process. They are often treated as exceptions because of their volume and the time needed to process them, e.g., manually splitting them into separate groupings for shipping if there are no boxes large enough to contain the entire order. The impact of these large shipments on the efficiency of the facility is considerable. Moreover, during peak periods, the impact of such shipments is even greater.

BRIEF DESCRIPTION OF THE DRAWINGS

FIGS. 6A-6F illustrate various groupings of items in an item package, according to one embodiment.

While embodiments described herein by way of example for several embodiments and illustrative drawings, those skilled in the art will recognize that the embodiments not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

A packaging information system may include various components used to facilitate efficient and/or cost-effective operations in a materials handling facility. For example, in some embodiments, a packaging information system may include a shipment splitting analyzer configured to facilitate packing and shipping operations by determining if and how a given group of items should be split into multiple groups of items for shipping. A shipment splitting analyzer may be configured to work together with a box recommender and/or package performance analyzer to facilitate packing and shipping operations or may be configured to work independent of a box recommender or package performance analyzer, in different embodiments.

A shipment splitting analyzer is described in detail herein. The shipment splitting analyzer described herein may be implemented in one or more software modules executing on one or more nodes of a computing system (e.g., as program instructions and data structures configured to implement functionality described), or in any combination of hardware and software components suitable for implementing the functionality described. For example, the shipment splitting analyzer may in some embodiments be implemented as program instructions encoded on a computer-readable storage medium for execution by a computing system.

For illustrative purposes, some embodiments of a shipment splitting analyzer are described below in which particular item and container parameters are analyzed in particular manners, and in which particular types of analyses and processing of parameters is performed. However, those skilled in the art will appreciate that the techniques described may be used in a wide variety of other situations, and that embodiments of these techniques are not limited to the details of these examples.

Figure 1:
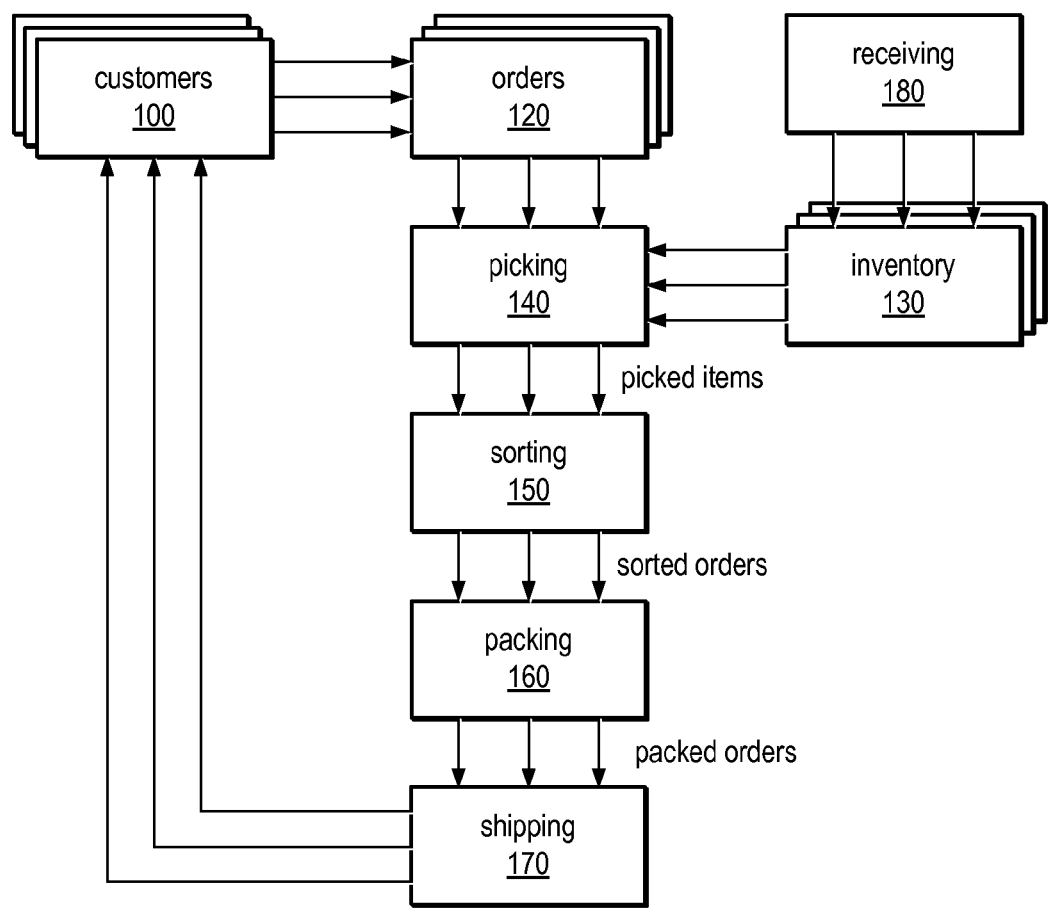
FIG. 1 illustrates a broad view of the operation of a materials handling facility, in one embodiment.

An exemplary block diagram of a materials handling facility, which in one embodiment may be an order fulfillment facility configured to utilize a shipment splitting analyzer, is illustrated in FIG. 1. In this example, multiple customers 100 may submit orders 120 to a distributor, where each order 120 specifies one or more items from inventory 130 to be shipped to the customer or to another entity specified in the order. An order fulfillment facility typically includes a receiving operation 180 for receiving shipments of stock from various vendors and storing the received stock in inventory 130. To fulfill the customer orders 120, the one or more items specified in each order may be retrieved or "picked" from inventory 130 (which may also be referred to as stock storage) in the order fulfillment facility, as indicated by block 140. In various embodiments, the items in an order may be divided into multiple item groups (i.e., shipment sets) for shipping by a shipment splitting analyzer at the order fulfillment facility before pick lists are generated or by a shipment splitting analyzer in a remote location before the order is received at the order fulfillment facility. In some embodiments, an order may be split into multiple item groups by another upstream process and portions of the order may be sent to two or more different fulfillment facilities for picking, packing, and shipping. These partial orders may be again split by a shipment splitting analyzer into multiple item groups (i.e., shipment sets) to be shipped from each of the facilities. Picked items may be delivered to one or more stations in the order fulfillment facility for sorting 150 into their respective orders or shipment sets, packing 160, and finally shipping 170 to the customers 100. Note that not every fulfillment facility may include both sorting and packing stations. In certain embodiments agents may transfer picked items directly to a packing station, such as packing station 160, while in other embodiments, agents may transfer picked items to a combination sorting and packing station (not illustrated). This may result in a stream and/or batches of picked items for multiple incomplete or complete orders being delivered to sorting 150 for sorting into their respective orders or shipment sets for packing 160 and shipping 170, according to one embodiment.

Note that portions of an order may be received at different times, so sorting 150 and packing 160 may have to wait for one or more items for some orders or shipment sets to be delivered to the sorting station(s) before completion of processing of the orders. As noted above, a picked, packed and shipped order does not necessarily include all of the items ordered by the customer; a shipped order may include only a subset of the ordered items available to ship at one time from one inventory-storing location. Also note that the various operations of an order fulfillment facility may be located in one building or facility, or alternatively may be spread or subdivided across two or more buildings or facilities. In various embodiments, items and groups of items may be transported between the stations or operations of the facility in one or more containers, through one or more portals, and/or using one or more dimensionally-constrained paths, as described herein.

In some embodiments, information about the containers used in handling one or more items during the operations described above may be automatically captured as a by-product of normal operation. For example, the packaging information system may receive or capture an identifier of a shipping container (e.g., a box) when an agent places an item in the container, according to various embodiments. Similarly, the packaging information system may automatically receive or capture an identifier of an item when it is placed in the container, in some embodiments. For example, a bar code or Radio Frequency Identification tag (RFID tag) of a container and/or an item may be scanned automatically as part of normal operations when items are placed in a container for shipping, and the data from the scanner may be automatically stored in one or more tables, databases, or other data structures accessible by the packaging information system. Therefore, in some embodiments, no additional steps may need to be performed to capture identifiers of the items and the containers in which they are placed. In some embodiments, these identifiers may be associated with one or more entries in tables, databases, or other data structures containing dimension and/or weight values currently associated with various containers and items.

A packaging information system may in some embodiments include a container recommender configured to instruct or recommend the selection, from among available containers, of a container in which to place one or more items, or a portal or path through which to convey the items, during the receiving 180, storing in inventory 130, picking 140, sorting 150, packing 160, or shipping 170 operations described above. For example, the system may be configured to recommend various boxes or other containers suitable for shipping one or more items or for storing or conveying one or more items in the materials handling facility, dependent on item dimension values and/or weight values currently associated with the items. In one embodiment, the system may recommend a particular box type and/or size suitable for shipping a group of items associated with a customer order based on item dimension values and/or weights provided by the vendor of each of the items in the group and the dimensions and weight limitations of the boxes available for shipping. In other embodiments, the system may recommend a particular box type and/or size suitable for shipping a group of items dependent on item dimension values and/or weights measured in the facility or learned by the packaging information system through an automated process of successive approximation. In some embodiments, the selection of containers that are neither too small nor larger than they need to be may result in more efficient use of space in the facility for storage and other operations, and may also reduce costs associated with floor space, packing materials, or transportation (e.g., shipping). In some embodiments, the box recommender may be used to estimate corresponding dimensions of a container suitable for storing, transporting, or shipping the items that is space-efficient and/or cost effective. Note that costs associated with the selection of an inappropriate container for a group of items may include labor costs associated with rework, if they must be removed from one container and placed in one or more other containers.

Note that, as used herein, "item packages" may refer to items grouped for shipping to a customer or items grouped for any other operation within a materials handling facility, such as for storing in inventory or transporting to a packing or shipping station. In various embodiments, "containers" may include pallets, crates, cases, bins, boxes, carts, totes, conveyor belts, shelves, cabinets, or any other apparatus capable of storing, conveying or shipping one or more items.

In some embodiments, a packaging information system may include a shipment splitting analyzer. For example, a shipment splitting analyzer may be used as part of a distribution operation for an organization that ships large numbers of item packages to customers. In some embodiments, the organization may maintain information about each of the items that is available to be shipped. If the system has sufficient information about the items intended to be the contents of an item package (e.g., if item dimension information and/or weight information is currently associated with the items in the item package), the shipment splitting analyzer may be configured to anticipate the total volume and/or weight of the item package based on the item dimensions and weight, and on the dimensions and/or weight of any non-item contents of the package (e.g., air bags or foam used as padding or filler, promotional inserts from the organization, etc), and may determine if the item package should be split into multiple sets of items for shipping based, at least in part, on the total volume and/or weight. In some embodiments, the shipment splitting analyzer may also be configured to determine the particular items and quantities of each item that should make up each shipment set based, at least in part, on the volume and/or weight of the items and non-items, and on limitations of target containers appropriate for each shipment set (e.g., container dimensions, volume, and/or weight limit). A shipment splitting analyzer is described in more detail below, according to various embodiments.

In some embodiments, the use of a shipment splitting analyzer, with or without a separate box recommender, may allow more efficient coordination of packing and shipping (i.e., transportation) operations. In some embodiments, if the number and size of boxes to be used in shipping an item package is reliably predicted by the shipment splitting analyzer, packing of shipment sets may be scheduled so that they are ready for shipment "just in time" for scheduled shipping operations appropriate for transporting each shipment set. For example, if the order fulfillment facility operates with a known schedule of shipments (e.g., a given transportation vendor picks up shipments eight times per day on a predetermined schedule), the packaging information system may use the results of the shipment splitting analyzer to schedule picking, sorting, and packing of each shipment set so that it is available at the loading area or at a particular chute in the loading area at the appropriate time for shipment at a predetermined one of the scheduled pick-up times. In another example, if a given item package includes a shipment set that may be transported using a specialty transportation service (e.g., a cost-efficient media mailing service), that shipment set may be scheduled for picking, sorting, and packing so that it is available for pick-up by the specialty transportation service according to the pick-up schedule for the specialty transportation service.

In some embodiments, the packaging information system may make particular assumptions about item dimensions or may assign item dimensions according to a standard algorithm, or company policy, in order to facilitate the recommendation of containers for item packages and/or shipment splitting analysis. For example, in one embodiment, the item dimension having the largest value may be designated to be the "height," the dimension having the second largest value may be designated to be the "length," and the dimension having the smallest value may be designated to be the "width" of the item. In such embodiments, the dimensions of containers may also be designated using the same assumptions. In other embodiments, different assumptions or assignments may be made, or the designation of length, height, and width dimensions of items or containers may be arbitrary. In some embodiments, standards or policies may specify other aspects of the packing and/or shipping operations of the facility, such as a default placement or orientation for certain items within containers or a specific packing algorithm to be assumed when recommending containers. For example, a policy may specify that the largest or heaviest item in an item package or shipment set should be placed horizontally along the bottom of shipping boxes.

A packaging information system, including a shipment splitting analyzer, as described herein in various embodiments, may be utilized in a number of different facilities and situations, including, but not limited to materials handling facilities, order fulfillment centers, rental centers, distribution centers, packaging facilities, shipping facilities, libraries, museums, warehouse storage facilities, and the like. Note that the arrangement and order of operations illustrated by FIG. 1 is merely one example of many possible embodiments of the operation of an order fulfillment facility utilizing a packaging information system or stand-alone shipment splitting analyzer. Other types of materials handling, manufacturing, or order fulfillment facilities suitable for application of a shipment splitting analyzer may include different, fewer, or additional operations and resources, according to different embodiments.

In some embodiments, a materials handling facility may store different instances of items in different individual inventory areas within inventory 130. Additionally, different items may be stored together in a single inventory area, according to particular embodiments. In some cases, storing different items together may result in more efficient use of total inventory space than using a single inventory area for multiple copies of a single item or product. In other cases it may be beneficial to store similar items together to make better use of inventory space. In some embodiments, such as that illustrated in FIG. 2, an inventory area within inventory 130 may include both similar items stored together, such as on one shelf, and different items stored together, such as on another shelf. In this example, storing different compact discs (CDs) together on a single inventory shelf, as shown in inventory area 235b, may use the available inventory space more efficiently than storing one CD among other items of greatly differing size and shape, such electronic devices, clothing, or other items. In some embodiments, a materials handling facility may also store items of similar, but not identical, shape and size together in a single inventory area. For instance, in one embodiment, items such as books, CDs, and digital video discs (DVDs) may all be stored together, as shown in inventory area 235a. In still other embodiments, different items, with different shapes and sizes, may all be stored together. For example, inventory area 235e illustrates clothing and electronic items stored along with books, CDs, etc.

Figure 2:
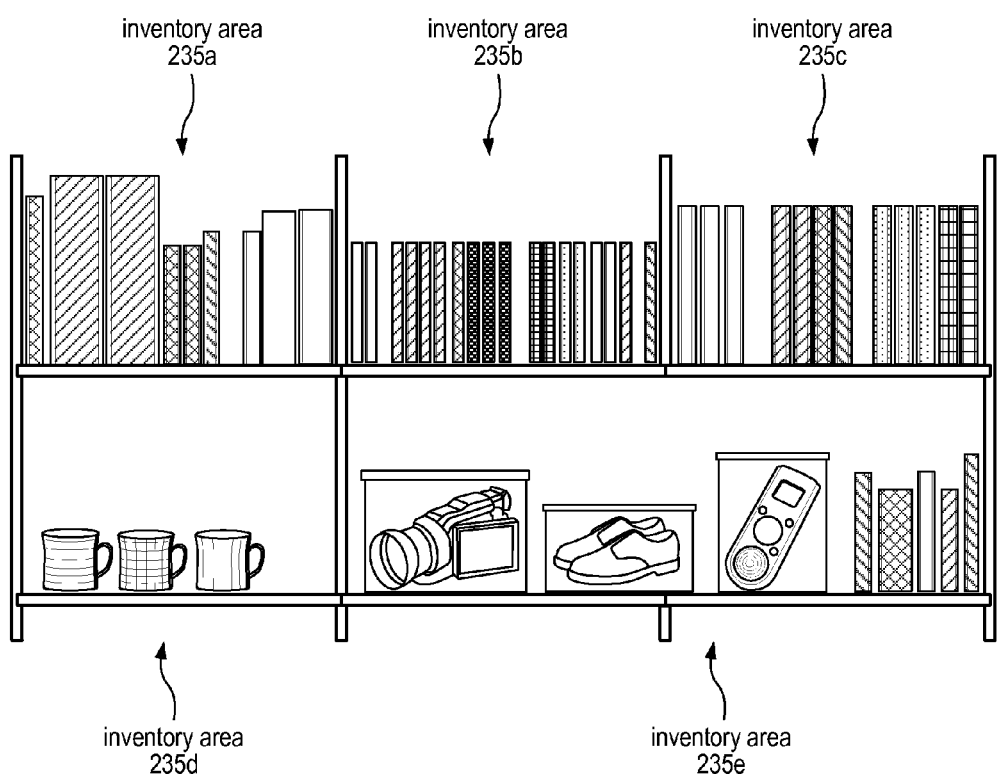
FIG. 2 illustrates various items stored in a multi-shelf inventory area, according to one embodiment.

The items in a materials handling facility may be of varying shapes and sizes, as shown in the exemplary inventory areas illustrated in FIG. 2. In this example, some items in the materials handling facility are irregularly shaped. In some embodiments, irregularly shaped items may be stored in boxes or other regularly shaped packaging, which may facilitate container recommendation, shipment splitting analysis, and/or more efficient storage, such as by making stacking of such items possible. This is illustrated in inventory area 235e. In other embodiments, irregularly shaped items may be stored, packed, and/or shipped without placing them in regularly shaped packaging. This is illustrated in inventory area 235d. According to various embodiments, shipment splitting analysis, as described herein, may be utilized with any regularly shaped or irregularly shaped items.

In a materials handling facility, such as the order fulfillment facility illustrated in FIG. 1, processing of large orders (i.e., those including a large number of different items and/or a large quantity of one or more items), may be made more efficient through the use of a shipment splitting analyzer, as described herein. For example, in some materials handling facilities without a shipment splitting analyzer, these large orders may cause workflow backups at chutes or other points in the workflow when large quantities of items are directed to a single area for packing and/or shipping. An automated picking/sorting operation may require manual intervention to clear such a chute jam. In the meantime, a chute jam may prevent subsequent items in the same shipment from entering the chute. This may cause these items to be re-evaluated or re-assigned (i.e., as to their destination in the facility and/or their inclusion in a given item package) on the sorter as they wait for the jam to be cleared. These items may stay on the sorter tray until they reach a maximum recirculation time, at which point they may be kicked out to an exception chute and require re-work to be placed back onto the sorter and ultimately united with the rest of the item package. For example, a particular sorter may impose a physical constraint, known as a "9-tray rule," for chutes. Such a rule may specify that one chute can be served by two trays on a first pass path around the sorter provided the two trays are a minimum of 9 trays apart. In one such embodiment, automated or semi-automated induction may be configured to place items on the sorter at a minimum of 5 trays apart, assuming that trays nearer to each other are not likely to be directed to the same chute. However, inventory for large shipments (e.g., one that include many copies of the same item or items) are often picked into the same totes. When an inductor is inducting a tote of items for the same large shipment, they may end up 5 trays apart. As a result, at least one of the items may not drop into the chute, but may re-circulate. This may lead to an excess use of limited resources (trays) and potentially a slowdown at induction, which can affect throughput of an entire automated sorting process.

In facilities that do not use automated picking operations, associates may manually collate large item packages, picking items for the item packages by hand (e.g., using a paper picklist), packing them into totes, and sending them off to be sorted for shipping. The average time needed to process these kinds of item packages may be exceedingly high, resulting in larger labor costs and/or less predictable arrival times for orders at the shipping operation. A similar problem may affect materials handling facilities with largely manual operations (e.g., those with manual picking, sorting, and/or packing operations). Processing of large item packages may be problematic in these facilities for the same and/or different reasons than those affecting more automated facilities. For example, large item packages for shipping may not be auto-collated in such facilities because the item packages may not be able to be gracefully handled by a rebinning operation (i.e. there may be too many items to fit into an individual rebinning area). Instead, they may be processed in a manual, one-off manner instead. Without auto-collate information, aging shipments may become overlooked and/or require manual intervention to process. In some facilities that employ manual picking/sorting/packing operations, rather than attempting to rebin large shipments, normal processing may be bypassed due to limited capacity in rebinning areas. In some such facilities, an extra scan check may be required for each item (i.e., for quality assurance) during rebinning, which may be tedious for associates and may be difficult to keep up with when large item packages are received at high rates. In general, the manual processing of large item packages in both highly automated and less automated facilities may require a large amount of labor costs.

In some embodiments, a computer-implemented method for performing shipment splitting analysis may facilitate more efficient operations in a material handling facility. A shipment splitting analyzer may automatically determine if, and how, a customer order or item package should be split into several shipments, so that each shipment can be packed in a box with maximum volume utilization and so that associates in the facility do not have to manually split the shipments. In some embodiments, the shipment splitting analyzer may be configured to determine the best (i.e., the most labor efficient, quickest, and/or cost efficient) combination of items per shipment, depending on the type and quantity of items in an item package, available box sizes and their capacity and shipping costs, and other variables.

Inputs to a shipment splitting analyzer may in some embodiments include information specific to an item package, such as an identifier of a materials handling facility in which the item package is to be packed for shipping (e.g., a warehouse identifier), a list of items in the item package (including, e.g., item identifiers and a quantity of each item), and order information (e.g., an order identifier, a customer identifier, an indication of whether it should be gift wrapped, transportation preferences, etc.). Additional inputs to the shipment splitting analyzer may not be specific (or exclusively applied) to a given item package. In some embodiments, these may include dimension, volume, and/or weight values associated with the items in the item package, shipping cost information, and a list of available box sizes. In some embodiments, these additional inputs may be obtained from one or more tables, databases, or other data structures accessible by the shipment splitting analyzer. The outputs of a shipment splitting analyzer may include an item list for each shipment into which an item package is split. In some embodiments, the item list for each shipment set may include an item identifier for each different item in the shipment set and a quantity associated with each different item in the shipment set.

The shipment splitting analyzer may in various embodiments be configured to analyze whether (and how) to split an item package into multiple shipment sets according to different fixed or configurable parameters available to it and/or according to policies of the materials handling facility. For example, the shipment splitting analyzer may in some embodiments take into consideration design and/or safety constraints of a target facility, such as the capacity of conveyor belts or chutes in the facility (e.g., to avoid backups), the largest size box that can be safely used at the facility, or the maximum allowed weight of a box that can be handled by the sorting equipment in the facility (e.g., 25 pounds). In some embodiments, the shipment splitting analyzer may take into consideration that some of the items in an item package may have a relationship that recommends or requires them to be shipped together. For example, a policy may specify that a cellular phone and its service plan details (e.g., documentation and/or authorization information) must be shipped together. In some embodiments, an item package that includes items with such relationships may not be split at all, while in other embodiments the shipment splitting analyzer may split such item packages, but may be configured to ensure that the related items are included in a same shipment set (e.g., by representing two or more related items with a single virtual item identifier).

A shipment splitting analyzer may in some embodiments determine that all or a portion of a large order should be shipped in pallet form, rather than by picking and packing individual items of the item package. For example, some materials handling facilities include inventory areas storing different types of items together, as illustrated in FIG. 2. In such facilities, the density of copies of a single item in an inventory area or region of the facility may be very low, making the picking operation for a large number of copies of a single item very inefficient (i.e., many such inventory areas may need to be visited to obtain the required number of copies of the single item). In addition, it may in some cases be cheaper to ship an intact pallet of a single item than to ship an equal number of copies of a single item in boxes. In some embodiments, the shipment splitting analyzer may include a fixed or configurable parameter specifying a quantity of a single item above which it may be more efficient to ship one or more pallets (or partial pallets) of the item rather than picking and packing multiple individual copies of the item from individual inventory areas and shipping them in boxes. If an item package includes a large number of copies of a single item, the shipment splitting analyzer may be configured to split the item package into one shipment set containing all of the copies of that item (or into multiple shipment sets each containing a pallet of that item) and one or more other shipments containing any copies of that item beyond those contained in an integer number of pallets, and/or any other items of the item package.

Conversely, the shipment splitting analyzer may include a fixed or configurable parameter specifying an item quantity threshold below which an item package may not be split. For example, in some embodiments, the shipment splitting analyzer may be configured not to attempt to split an item package into multiple shipments if it includes fewer than 5 total items. In still other embodiments, fixed or configurable parameters may specify a combination or ratio of the number of distinct item identifiers and the number of distinct or total items that serve as an input threshold for the shipment splitting analyzer. For example, in one embodiment, a shipment splitting analyzer may be configured to attempt to split all item packages unless the number of distinct item identifiers is less than 5 and the total number of items is greater than 80. In this example, item packages outside these thresholds may be handled using an exception process rather than using the shipment splitting analyzer.

In some embodiments, an application operating on behalf of the materials handling facility, or a parent organization thereof, upstream of the shipment splitting analyzer may in some embodiments call the shipment splitting analyzer, and may pass order information to the shipment splitting analyzer. This upstream application may in some embodiments be a component of an overall inventory management application and/or may include functionality for dividing a customer order into multiple item packages directed to different materials handling facilities according to item availability (as described above), customer and/or order parameters and/or other business policies, before calling the shipment splitting analyzer. In some embodiments, a customer order may be divided into multiple item packages dependent on a service level agreement with a given customer or associated with a given customer order (i.e., a premium service level for a customer or a premium shipping option for an order). For example, a customer order from a preferred customer or associated with a premium shipping option may be split into two or more item packages by an upstream fulfillment planning engine and each item package may be directed to a different order fulfillment facility so that each item in the customer order may be picked, packed and shipped from the facility nearest to the customer or from which shipping may be most quickly performed, or an item package may be split into multiple shipments (from a same or different facilities) in order to facilitate faster picking than if all the items are in one shipment set. In another example, a customer order specifying that a portion of the items be gift wrapped may be split into multiple item packages so that items to be gift wrapped are directed to one or more facilities having gift wrapping capability and other items are directed to one or more facilities that do not have gift wrapping capability. In yet another example, an upstream fulfillment planning engine may be configured to split a customer order into multiple item packages if some of the items in the item package are not available (i.e., if they are on backorder), so that the available items may be shipped without waiting for all of the items to be available. Conversely, in some embodiments, an upstream fulfillment planning engine may be configured to determine that an order should not be split based on a customer preference or customer-specified parameter for a given order (e.g., if a customer chooses a "ship all items together" option, rather than a "ship as fast as possible" option). Note that in some embodiments, customer input may also be used to determine whether to wait for back-ordered items to ship with other items or to ship available items ahead of any back-ordered items.

Once a customer order has been split according to various business criteria into two or more item packages, if appropriate, each item package may be directed to a particular materials handling facility for order fulfillment. A shipment splitting analyzer may be employed to determine if each of the resulting item packages should be further split into multiple shipment sets for shipping. The shipment splitting analyzer may load parameter values specifying shipment splitting criteria, item attributes (e.g., dimensions, volume, weight, relationships with other items, fragility, etc.) and container information (e.g., dimensions, volume, weight capacity, costs of shipping materials, transportation costs, facility-specific constraints, customer-specific constraints, destination-specific constraints, etc.) from one or more data stores within or remote to the materials handling facility. The shipment splitting analyzer may determine, based on all or a portion of the input information, if an item package should be split into multiple shipment sets, and, if so, how. In some embodiments the shipment splitting analyzer may return the results to an upstream application (which in some embodiments may be the application that called the shipment splitting analyzer), while in others it may be configured to pass the results to a downstream application serving the facility to which an individual item package is directed. Note that in some embodiments, the number of shipment sets may affect the manner in which a customer is charged for their order. For example, some materials handling facilities may not charge a customer for their order until it has been shipped (or is ready to ship). In such embodiments, a shipment splitting analyzer may be used to determine, as soon as possible, whether or not an order may be split into multiple shipments, allowing the system to provide the customer with timely feedback (e.g., during an online ordering session) as to the number of shipments and charges to expect for their order (e.g., at "checkout" time).

Note that in some embodiments, it may be advantageous to ship an item package in the fewest possible number of shipments (e.g., when transportation and/or credit card transaction fees are dependent on the number of shipments and/or charges made by an e-commerce provider). In some embodiments, the shipment splitting analyzer may be configured to explore two or more alternatives for splitting items into shipment sets (i.e., with different combinations of items grouped together) in order to make a trade-off between various labor, transportation, and/or packaging costs associated with each combination of shipment sets and any fees associated with having more or fewer total shipments. For example, in one embodiment, a shipment splitting analyzer may be configured to iterate on two or more shipment splitting alternatives, returning results of each to another application (e.g., an upstream fulfillment planning engine) that selects one of them for implementation. The different alternatives may be split by the shipment splitting analyzer using different sorting parameters, different splitting thresholds, different target box sizes, or by based on the configuration and/or capabilities of different materials handling facilities to which portions of the item package may be directed. The alternative to be implemented may be selected based on determining the costs associated with each alternative and/or based on other business criteria (e.g., policies, customer preferences, etc.) For example, in one embodiment, the shipment splitting analyzer may include a costing function; while in another embodiment a separate application (e.g., a package performance analyzer) may be invoked to determine costs associated with alternative shipment splitting options.

Figure 3:
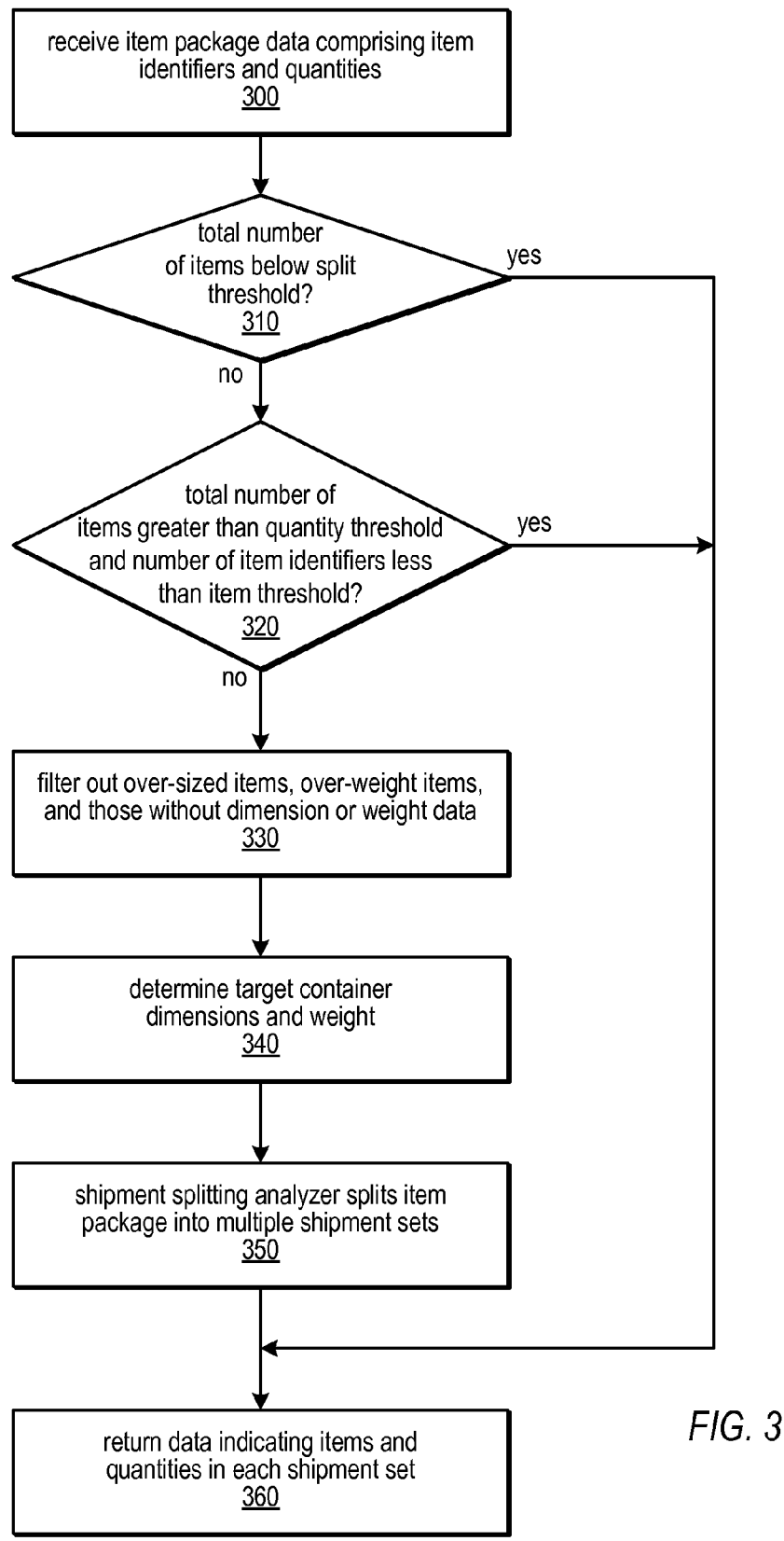
FIG. 3 illustrates a method for determining whether an item package should be split for shipping, according to one embodiment.

One method for determining whether an item package should be split for shipping is illustrated by the flow chart in FIG. 3, according to one embodiment. In this example, the method may include receiving data corresponding to an item package (e.g., an order or portion thereof directed to a given facility), as in 300. This item package data may include identifiers of each different item in the item package, along with the quantity of each item to be included in the item package. As described above, in some embodiments the method may include an item count threshold below which the shipment will not be split. In the example illustrated in FIG. 3, this is shown as decision block 310. If the total number of items in the item package is below this threshold, shown as the positive exit from 310, the method may include returning data indicating the items and their quantities in each shipment set, as in 360. In this case, the data returned may indicate that the same item identifiers and quantities that were input, i.e., the entire item package, will be included in a single shipment set. Note that in some embodiments, the split threshold may be set to a value of 1, indicating that no shipments will be considered for splitting. For example, in some materials handling facilities that do not include automated picking and/or sorting, the shipment splitting analyzer may not be called, as the impact on such facilities may not be very high compared to any costs associated with implementing the shipment splitting analyzer.

If the total number of items in the item package is not less than the threshold for splitting the item package, shown as the negative exit from 310, the method may include determining if the total number of items in the item package is greater than a second threshold and if the number of different items (e.g., as evidenced by the number of different item identifiers) in the item package is less than a third threshold, as in 320. In other words, if an item package includes a large number of a single item, or large numbers of a few items, the method may include handling these item packages outside of the shipment splitting analyzer, shown as the negative exit from 320. For example, in some embodiments at least some of the items included in item packages flagged by a determination such as that illustrated in 320 may be picked and shipped as whole or partial pallets, rather than as individual items picked from inventory and placed in a large number of boxes. In the example illustrated in FIG. 3, the input data for these item packages may be returned at 360 without being split.

If the item package is eligible for shipment splitting (or for an attempt at shipment splitting), shown as the negative exit from 320, the method may include filtering out any over-sized or over-weight items from the item package, as in 330. For example, in some embodiments, individual items that are larger than the largest available standard box, or that exceed the maximum weight limit for the available standard boxes, may be filtered out of the item package for exception handling, and may be included in one or more separate item packages for the purpose of shipping (not shown). In some cases, these items may require custom packaging for shipping, e.g., a custom container may be built for these items. As shown in 330, the method may in some embodiments filter out items for which the system does not currently have dimension and/or weight information, or for which the available dimension and/or weight information is suspect. Filtering out items that require exception handling before attempting to split the item package into multiple shipment sets may in some embodiments allow at least a portion of an item package to be packed for shipping more efficiently than if the system were to attempt to split an item package that includes such items, causing an exception later in the workflow.

In the example illustrated in FIG. 3, once exceptions have been filtered out, the method may include determining target container, and its dimensions and weight, as in 340. In some embodiments, the target container may be selected as the largest available container that is standard in the target facility. In other embodiments, another default container may be selected by the system (e.g., based on the type of items being shipped, any destination-specific, transportation-specific, or customer-specific restrictions on container sizes and/or weight), or a box recommender, as described above, may be called to determine a target box size for the item package based on the dimensions and/or weight of the items in the item package. For example, item packages intended for a particular destination may be limited to boxes smaller than a specified maximum size or weight, due to capacity or logistical considerations at the destination (e.g., the capabilities of a receiving warehouse, customs operation, or third party distributor in a destination country or region).

Figure 4:
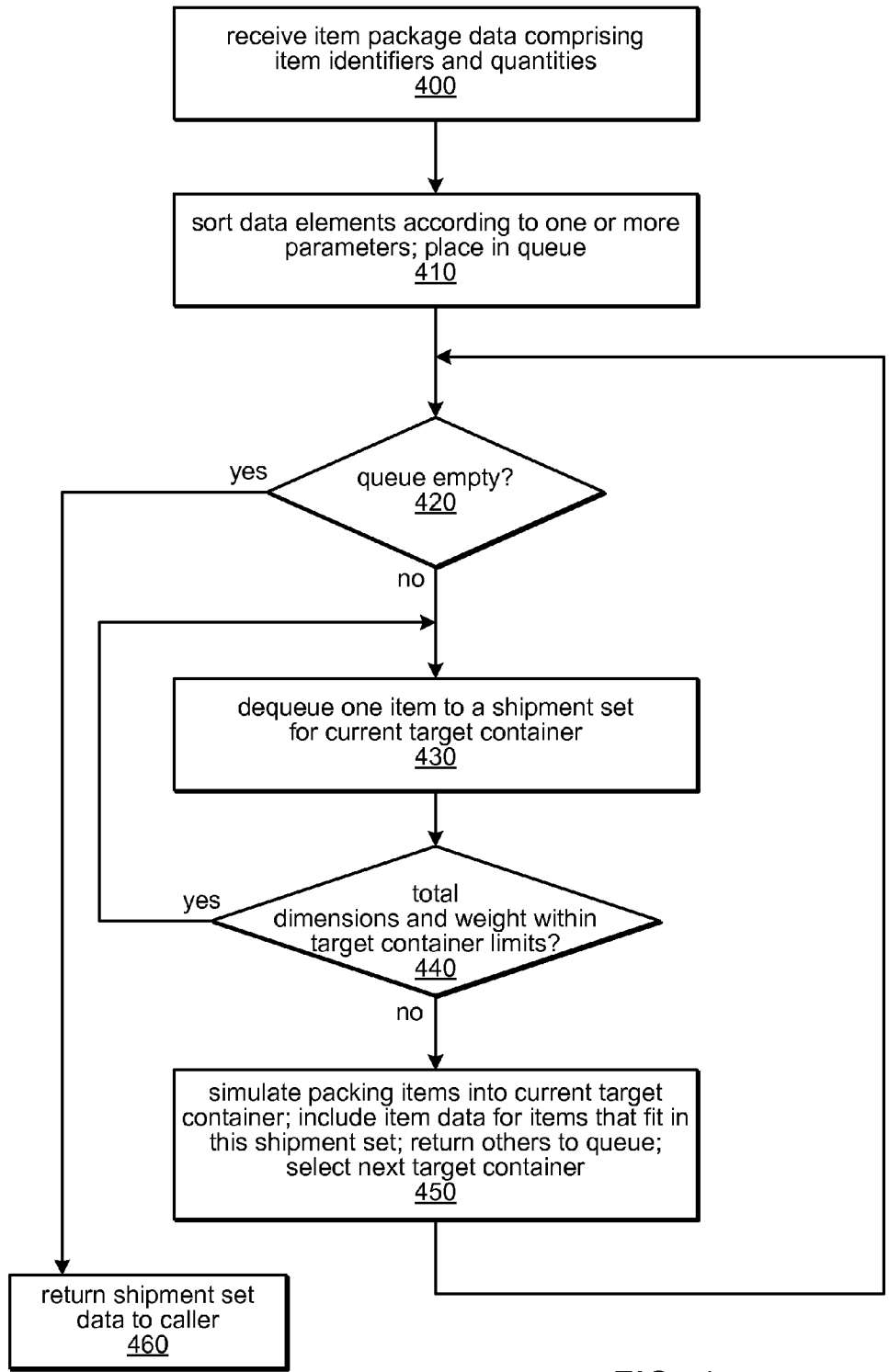
FIG. 4 illustrates a method for splitting an item package into two or more item sets for shipping, according to one embodiment.

As illustrated in 350, the method may include calling a shipment splitting analyzer to split the remaining items of the item package (i.e., those that have not been filtered out), into multiple shipment sets. One method for shipment splitting analysis is illustrated in FIG. 4 and described below. Note that in different embodiments, the methods illustrated in FIGS. 3 and 4 may be implemented as separate software applications executing on one or more computer systems in one or more physical locations, as functions or modules of a single software application executing on one or more computer systems in one or more physical locations, or as components of an overall inventory management system (e.g., one implemented as a distributed application in a materials handling facility, or as an application executing in a central control system of the facility).

Once the shipment splitting analyzer has determined the items and quantities of items in each shipment set, the method may include returning data indicating this information for each shipment set, as in 360. For example, in some embodiments, data indicating the items and quantities of items in each shipment set may be provided to a target facility for picking, packing, and shipping instead of, or in addition to, the original item package information that was input to the method. Whether or not the complete item package information is provided to the facility in its original form, the data indicating the items and quantities of items for each shipment set may include an indication of the original item package identifier, and this item package identifier may be associated with each of the shipments in a central data store on behalf of the facility. Note that in some embodiments, each of the multiple shipment sets may include a shipment set identifier instead of, or in addition to, an original item package identifier. For example, in some embodiments, once an item package has been split into multiple shipment sets, each of the shipment sets may be treated (within the facility) as if it were a separate item package without an association to any other item package.

In one embodiment, a request or call to the shipment splitting analyzer may be represented using the following format:
    Input: map<item_id, quantity>

Output: vector<map<item_id, quantity>>

In this example, each element of the output vector may represent one shipment set, and may define the item identifier (item_id) and quantity of each distinct item in that shipment set. As previously noted, policies for determining whether and how to split item packages may be configurable, and different policies may be applied to different materials handling facilities, customers, order sizes, destinations, item types, etc. Several examples of policies that may be applied to different facility configurations are listed below. The application of each of these policies may be optional or required, in different embodiments.

- Max non-split item quantity (N). This policy may specify that any item package that includes N or fewer total items will not be split. A default value for this policy may in some embodiment be N=1, meaning that the shipment splitting analyzer may be called for all item packages containing 2 or more items.
- Target box size (X, Y, Z). This policy may specify, for example, the largest box usable in an automated sorting/packing operation or the largest box to be assumed during shipment splitting analysis (e.g., based on any facility-specific, destination-specific, customer-specific, or order-specific constraints). In some embodiments, the shipment splitting analyzer will attempt to split the item package into multiple shipment sets to be shipped in boxes of this size. In some embodiments, this may be a fixed value for a given facility, customer, destination, or transportation method.
- Max weight (W). This policy may specify, for example, a maximum weight of a shipping container, e.g., when using an automated sorting/packing operation, or due to transportation restrictions or costs. For example, one automated picking/sorting/packing system may impose a limit of 27 lb on any individual shipping container. In some embodiments, max weight may be a fixed value for a given facility, while in others a default or configurable value for max weight may be specified for given facility, customer, destination, or transportation method, for example.
- BIG max unique item_id (P), min total quantity (Q). This policy may specify that large item packages with P or fewer unique item identifiers and Q or greater total items should not be split. For example, the shipment splitting analyzer may be configured to determine that an item package that includes 3 unique item identifiers and 100 copies of each item should not be split using the shipment splitting analyzer, but should be singled out for exception handling (e.g., to facilitate more efficient picking and/or shipping as intact or partial pallets). In various embodiments, these parameters may have fixed or configurable values, and/or may include a default value specific to a given facility, customer, destination, or transportation method.
- Max allowable split. This policy may specify a maximum number of shipment sets into which an item package may be split. The maximum number of allowable splits may be a fixed or configurable value and may include a default value (e.g., on the order of 50, in some embodiments). If the number of shipment sets determined to be needed by the shipment splitting analyzer exceeds this threshold, the shipment splitting analyzer may return the item package list without splitting it, as it may be deemed to be more efficient to palletize the item package or otherwise apply an exception handling operation. For example, if the number of shipments sets determined to be most efficient by the shipment splitting analyzer exceeds the predetermined maximum number of shipment sets, the item package may be flagged for exception handling to determine if any of the input data was inaccurate, and/or to determine if there is a more efficient (and/or cheaper) method of shipping the item package than in a large number of separate shipments.

Once it has been determined that an item package should be split, there may be several different scenarios that affect how the item package should be split. In one scenario, there are known (or at least estimated and/or trusted) dimensions and weights for all items in the item package, each item has dimensions less than a specified set of maximum values (X, Y, Z) and the weight of each of the items is less than a specified maximum weight, W. For example, in some embodiments, an external party (e.g., a supplier or manufacturer of an item) may provide item dimension and/or weight information for items that they supply. In some embodiments, the item dimension and/or weight values associated with a given item are trusted to be accurate (e.g., if an item has been measured recently, if the item dimension and weight values provided by a particular vendor have consistently been shown to be accurate, or if the inventory management system has determined that estimated item dimension and weight values are likely to be accurate through a machine learning process). In another example, some item dimension values are standard for a particular product type (e.g., the width of CDs, DVDs, or VHS products) and may be considered trusted dimensions. In some embodiments, if all the item dimensions and weights are known or trusted, an attempt to split the item package into multiple shipment sets may be made. In some embodiments, the items in such an item package may be ordered by category, product line, affinity (e.g., so that fragile items are grouped together and/or separately from heavy and/or bulky items; or so that items that are required to be shipped together are grouped together), or by other parameters (e.g., volume, largest dimension, weight, or whether they will be gift wrapped), and placed in an item pool (queue) for assignment to a shipment set. In this example, items may be added one at a time, in order, to a proposed shipment set pool until the total volume or the total weight exceeds X·Y·Z or W, respectively. A box recommendation algorithm may be called (which may be implemented as a component of the shipment splitting analyzer or as a stand-alone application, in different embodiments) to recommend a box suitable for use in shipping the items in the shipment set. Note that in some embodiments, a box recommender may be called at a different time, such as to determine a single target box for all of the shipment sets of an item package, or to determine a default target box dependent on item quantities, item types, capabilities of the materials handling facility, transportation constraints, and/or any other suitable parameters.

In this example, the box recommender algorithm may return an indication of which items will actually fit in the recommended box and which will not (e.g., according to a packing simulation or packing algorithm). For example, even if the maximum volume and/or weight limits of a container are not exceeded, the particular shapes of the items in a proposed shipment set may not allow that combination of items to fit in the recommended box. The items that will actually fit in the recommended box may be included in the current shipment set, and any remaining items in the proposed shipment set may be returned to the queue. In this example, the operations described above may be repeated, building another proposed shipment set and determining which of the items would actually fit in a recommended box, until there are no more items in the queue. The shipment splitting analyzer may then return the split shipments vector, as described above.

In another scenario, at least one item in an item package may have known (or estimated) dimensions larger than a specified set of maximum values (X, Y, Z), a weight more than a specified maximum, W, or may not have known dimensions and/or weight. In some embodiments, such item packages may be handled by processing these items separately from the items meeting the specified size and/or weight limits. For example, in some embodiments, items in the item package having dimensions smaller than (X, Y, Z) and weight lighter than W may be handled as described in the previous scenario. After the items meeting the specified limits have been split into one or more shipment sets by the shipment splitting analyzer, items without known dimension/weight values, items larger than (X·Y·Z), and items heavier than W may all be allocated to the shipment set with smallest volume prior to the addition of the out-of-specification item(s). In some cases, this may cause this particular one of the shipment sets to be too big or too heavy for the target box (e.g., the largest box available in the facility), and this shipment set may be later singled out for exception handling. However, in some cases, items of unknown dimension and/or weight may be small enough to fit in the target box along with the other items in the shipment set, and no exception processing may be necessary. In some embodiments, this method may result in some individual shipment sets, but fewer entire item packages, being handled using exception processing than if the shipment splitting analyzer were not applied to the item packages.

In yet another scenario, none of the items in an item package have known dimensions and/or weight values associated with them. In some embodiments, the shipment splitting analyzer may not be called for this scenario. Rather, the item package may be handled as an exception without attempting to automatically split it into multiple shipment sets.

In each of the scenarios described above, the results of the shipment splitting analysis (e.g., the lists of items and quantities of each item in each shipment set) may be checked against the input item package information to determine if the total number of items in the collection of shipment sets is correct, and if the total number of items corresponding to each unique item identifier in the collection of shipment sets is correct. If either of these checks fails, the shipment splitting analyzer may return the input item package information (i.e., prior to the attempt to split the item package) as the result of the shipment splitting analysis. In some embodiments, one or more additional attempts to split the item package may be made before providing the item package information to the facility as a single shipment set or to an exception handler for processing and/or error analysis. In other embodiments, following one failed attempt at splitting the item package, the original item package information may be provided to the facility as a single shipment set or may be provided to an exception handler.

As described above, a shipment splitting analyzer may in some embodiments provide a computer-implemented method for automatically splitting an item package into two or more item sets for shipping. FIG. 4 illustrates one such method, according to one embodiment. The method illustrated in FIG. 4 may in some embodiments implement the shipment splitting operation shown at 350 of FIG. 3. In this example, the shipment splitting analyzer may receive item package data that includes item identifiers and quantities of those items, as in 400. As described above, this item package data may include all the data related to items in a complete item package, or may include only those items that were not previously filtered out, e.g., due to size or weight restrictions or the absence of trusted dimension and/or weight information. In some embodiments, the data received for an item package may also include an indication of a target container for one or more shipment sets and/or its dimension and weight. In other embodiments, the shipment splitting analyzer may determine a target container dependent on the item data received, the available containers in the facility, and/or any other information that may or may not have been available before the shipment analyzer was called. For example, an upstream function in the facility may have assumed a particular target container for an item package based on the containers usually available at the facility (or those projected to be available), but a recent change in the configuration of the facility or a problem with quality or delivery of that particular container type in the facility may have rendered the target container type unavailable.

In this example, the received data may be sorted according to one or more fixed or configurable parameters and placed in one or more queues (e.g., according to the parameters), as in 410. For example, if an item package includes different types of items (e.g., both books and clothing items), the item package data may be sorted into separate queues for books and for clothing items (e.g., to take advantage of cheaper shipping methods for media items or other specialized transportation services). In another example, if an item package includes some fragile items, these may be sorted into a different queue than non-fragile items. In some embodiments, items may all be placed in a single queue, and may be ordered in the queue according to one or more item parameters, as described herein. For example, in one embodiment, items in each queue (or in a single queue) may be ordered by length or weight (e.g., when packing guidelines specify that the largest and/or heaviest items should be placed in containers first), or by quantity (e.g., so that items for which multiple copies are ordered are placed in containers first and single items are used to fill in any remaining space in each container.)

In the example illustrated in FIG. 4, the method may include determining if the queue is empty, shown as decision block 420, and iterating until it is empty. If the queue is not empty, shown as the negative exit from 420, the method may include dequeuing one item to a shipment set for the current target container, as in 430. The method may include determining if the total dimensions and weight for the shipment set, including the newly dequeued item, are within the limits of the target container, as in 440. If so, the method may include dequeuing another item for the shipment set. This is illustrated in FIG. 4 as the feedback look from the positive exit of 440 to 430. If, on the other hand, the limits of the target container would be exceeded if the shipment set included the newly dequeued item, shown as the negative exit from 440, the method may include simulating packing the items of the shipment set into the current target container, or into a recommended container, as in 450. For example, the shipment splitting analyzer may call or invoke a box recommender function to determine if the target box is the appropriate size for the shipment set and may simulate packing the shipment set items in a recommended box rather than the original target container (e.g., if the weight limit were reached or exceeded for the shipment set, but the volume and/or dimension limits have not been reached for the shipment set). In the example illustrated in FIG. 4, the items that would fit in the target or recommended container are included in the shipment set, and any others are returned to the queue. In this example, a target container is selected for the next shipment set before returning to 420 to process more items in the item package. Again the target container may be selected based on data provided to the shipment splitting analyzer, or by the shipment splitting analyzer itself, in different embodiments.

In the example illustrated in FIG. 4, the method may include continuing to dequeue items into successive shipment sets, as described above regarding elements 430-450, until the queue is empty. Once the queue is empty, shown as the negative exit from 420, the shipment splitting analyzer may return data indicating the items and quantities in each shipment set to the calling routine, as in 460. In some embodiments, the shipment splitting analyzer may also return an indication of a recommended container for each shipment set, while in other embodiments, a box recommender may be invoked for each shipment set subsequent to the shipment set data being returned to a calling application.

Note that in some embodiments, the shipment splitting analyzer and a box recommender may be invoked in an iterative manner, exploring different alternatives for splitting the item package into multiple shipment sets until optimum box utilization is reached (not shown). For example, in one embodiment, the shipment splitting analyzer may output a collection of shipment sets and a box recommender may determine the best-fit box in which to ship each shipment set. The box recommender may also be configured to determine the volumetric utilization of each recommended box and to determine if the box meets minimum utilization targets for shipped boxes (e.g., to determine if the box is "full enough"), returning an indication of the results. If the shipment sets do not meet the minimum utilization targets, the shipment splitting analyzer may be configured to explore other shipment splitting alternatives (e.g., using different parameter values, thresholds, or target box sizes) until a suitable combination of shipment sets is found (e.g., one meeting the minimum utilization targets for all boxes, or for the highest possible number of boxes, or having the highest overall box utilization).

Shipment splitting analysis, as described herein, may be implemented in one or more software modules executing on one or more nodes of a computing system or using any combination of hardware and software components of a computing system, in various embodiments. Item and container dimension and/or weight values may be stored in one or more tables, databases, or other data structures maintained on one or more computing system nodes within a materials handling facility and/or remote computing system nodes configured to communicate with the operations of the materials handling facility. Similarly, container recommendations and/or feedback regarding actual containers in which item packages are shipped may be exchanged between one or more computing system nodes within a materials handling facility and/or remote computing system nodes configured to communicate with the operations of the materials handling facility.

Figure 5:
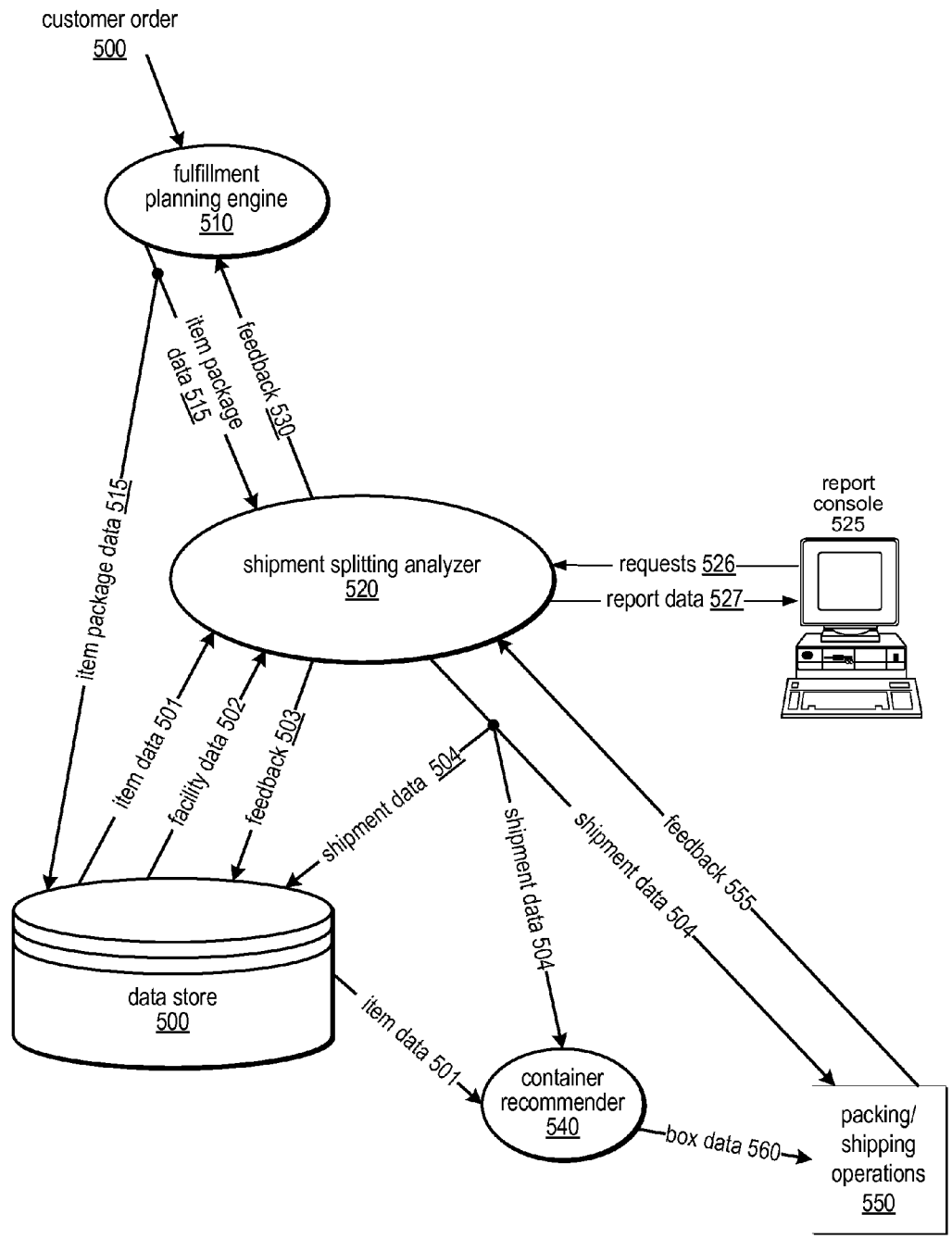
FIG. 5 illustrates a data flow diagram for a system implementing shipment splitting analysis, according to one embodiment.

As discussed above, in some embodiments a shipment splitting analyzer may be a component of an overall packaging information system in a materials handling facility. FIG. 5 illustrates a data flow diagram for a packaging information system that includes a shipment splitting analyzer, according to one embodiment. The packaging information system may include various hardware and/or software components configured to carry out the operations described herein as part of shipment splitting analysis, container recommendation, and/or package performance analysis. In this example, data store 500 may be a data store containing item parameter values (e.g., item dimension and weight values) for all of the items handled within a materials handling facility and may also contain container parameter values (e.g., container dimensions, weight, and/or capacity information for each type of container used within the facility). Data store 500 may be a data store located within the materials handling facility itself and accessed by the various operations of the facility or may be a remote data store accessed by various operation of the facility via a network over which they are connected.

As illustrated in FIG. 5, a packaging information system may in some embodiments include an upstream fulfillment planning engine 510, configured to determine the facility or facilities to which an item package or complete customer order should be directed. As described above, a fulfillment planning engine 510 may in some embodiments be configured to determine whether or not a single fulfillment facility is able to provide all of the items in an order, and may pass subsets of a customer order to the smallest number of fulfillment facilities that may supply the required items. In other embodiments, fulfillment planning engine 510 may be configured to divide a customer order into multiple item packages dependent on other parameters, including, but not limited to, a service level agreement, the location of one or more facilities with respect to a destination, customer and/or order priorities (e.g., premium customer service or premium shipping considerations), specialty transportation service availability, or specialty services capability (e.g., gift wrapping or export services).

Fulfillment planning engine 510 may provide item package data 515 for a customer order (which may include multiple item packages making up a customer order), to one or more shipment splitting analyzers 520 (e.g., to a shipment splitting analyzer 520 in each of two or more target facility or to one or more centrally located shipment splitting analyzers 520 on behalf of one or more target facilities). In some embodiments, shipment splitting analyzer 520 may provide feedback 530 to fulfillment planning engine 510 (e.g., feedback indicating the results of shipment splitting analysis, the configuration of a target facility, the capabilities and available services of a target facility, the available containers of a target facility, etc.). In some embodiments, this feedback may be used to analyze packaging performance of the facility or of the overall inventory management organization (not shown). In the example illustrated in FIG. 5, fulfillment planning engine 510 may also provide item package data 515 to data store 500 for storage and/or future analysis.

In the example illustrated in FIG. 5, shipment splitting analyzer 520 may obtain item data 501 and facility data 502 from data store 500. Item data 501 may include dimension information, weight information, affinity and/or relationship information, or category information associated with each item in an item package, in various embodiments. Facility data 502 may include facility configuration, capability, or constraint information; available container information; dimension, weight or capacity information for available containers; and/or information about services available at the target facility. As described above, any or all of item data 501 and/or facility data 502 may be used by the shipment splitting analyzer 520 to determine if and how an item package should be split into multiple shipment sets. In some embodiments, shipment splitting analyzer 520 may provide feedback 503 to data store 500 for storage and/or future analysis. For example, in some embodiments, information indicating if and/or how an item package was split (e.g., by what parameter(s) it was sorted, the target container used in the splitting algorithm, or the number of iterations attempted before it was split or the attempt to split it was abandoned). This information may in some embodiments be analyzed by the shipment splitting analyzer or packaging information system later to produce reports and/or to determine trends in the operation of the materials handling facility and/or the shipment splitting analysis, as described herein.

In the example illustrated in FIG. 5, shipment splitting analyzer 520 may output shipment data 504, which may include a list of item identifiers for items included each shipment set and quantities associated with each item identifier in each shipment set, as described above. Shipment data 504 may in various embodiments be provided to data store 500 (e.g., for storage and/or future analysis), a container recommended 540, and/or directly to packing/shipping operations 550 in the target facility for a given item package. For example, in some embodiments, a stand-alone container recommender 540 may be invoked by the system subsequent to determining the shipment set(s) making up an item package, and may provide box data 560 associated with each shipment set to packing/shipping operations 550. In other embodiments, a container recommender (e.g., a software module similar to a stand-alone container recommender 540) may be invoked by shipment splitting analyzer 520 as part of its analysis, and box data (similar to box data 560) may be provided to packing/shipping operations 550 by shipment splitting analyzer 520 as part of shipment data 504.

Note that shipment data 504 may be provided to packing/shipping operations 550 on an input/output device readable by an agent working in the materials handling facility, in some embodiments. In other embodiments, shipment data 504 may be printed for an agent, such as on a pick list or packing list. In still other embodiments, a machine may be configured to pick and/or present a recommended container (such as a box) to an agent or to an automated packing system and/or to automatically transport the items in a given shipment set to a portal, path, or packing station (e.g., one suitable for handling containers having a particular range of dimensions and/or weight capacity) for packing. In some embodiments, an automated sorting system may be configured to transport packed shipment set(s) to an appropriate loading area and/or chute to a loading area for "just in time" shipping. Note also that packing/shipping operations 550 may provide feedback 555 to shipment splitting analyzer 520 (e.g., feedback an actual container used for each shipment set, the configuration of a target facility, the capabilities and available services of a target facility, the available containers of a target facility, etc.). Feedback from packing/shipping operations 550 may be received from an agent (e.g., as data entered by an agent on a terminal or other communication device), in some embodiments, or from an automated feedback mechanism of various operations of the materials handling facility.

As illustrated in FIG. 5, a shipment splitting analyzer may in some embodiments be configured to provide report data 527 in response to one or more requests 526. In this example, report console 525 may include a web browser through which a user may request various reports and on which these reports may be displayed. For example, a user may request one or more reports regarding the number or percentage of item packages split into multiple shipment sets, the number or average number of items in each shipment set, the number or percentage of item packages requiring exception handling for shipment splitting, the number or percentage of item packages shipped as whole or partial palettes, or the performance of the overall packaging operation in terms of speed, rework, or meeting transportation schedules with packed shipment sets ready "just in time". In some embodiments, trends of each of these metrics may be reported and/or analyzed in order to identify opportunities to improve the shipment splitting algorithm and/or the configuration of a given materials handling facility. For example, if one of these metrics changes by a given percentage (up or down), the shipment splitting analyzer may be configured to flag the change and/or to trigger a review of the performance of the packaging information system or the operation of a given facility.

While the embodiment illustrated by FIG. 5 includes a fulfillment planning engine 510, a shipment splitting analyzer 520, and a container recommender 540 that are separate components of a system configured to manage packing/shipping operations in a materials handling facility on behalf of an order fulfillment operation, in other embodiments, the functionality described as being performed by each of these components may all be performed by sub-components of a single system component, or may be partitioned in other ways. For example, in one embodiment, container recommender 540 may be implemented as a module of a software application configured to implement shipment splitting analyzer 520. In another example, data store 500 may be located in a memory of the same computing node or of a different computing node than a memory that includes program instructions configured to implement a packaging information system, fulfillment planning engine 510, shipment splitting analyzer 520 and/or container recommended 540. In some embodiments, the packaging information system In some embodiments, the packaging information system may also include a remote data store, such as a data store located at a headquarters of a company operating the materials handling facility. In some embodiments, metrics may be provided by data store 500 to such a remote data store concerning the operations of the materials handling facility. These metrics may include shipment data 504, container usage data, report data 527, and other data collected and/or collated by the packaging information system. Metrics that may be extracted from data store 500 may be analyzed and compared to similar metrics received by a remote data store from other materials handling facilities, in some embodiments. For example, these metrics may be used to identify best practices at one or more materials handling facilities. In another embodiment, information may be provided to a remote data store by data store 500 and may be distributed to other materials handling facilities configured to exchange information with the remote data store.

As previously noted, a packaging information system may in some embodiments include separate package performance analyzer (not shown). In some embodiments, a package performance analyzer may be configured to determine the shipping costs associated with a split shipment and to compare them to estimated shipping costs for a shipment that includes all of the items of an item package (e.g., costs associated with building or obtaining custom containers, costs associated with the use of more or less expensive specialty transportation services, costs associated with multiple financial transactions or multiple shipments, etc.). In another embodiment, a package performance analyzer may be configured to determine and/or compare costs associated with two or more alternate shipment splitting options, as described herein. A package performance analyzer may in some embodiments be configured to generate reports on the performance of the shipment splitting analyzer, such as those described herein. In some embodiments, the data included in these reports may be sorted by time/date or time/date range, by customer, by item package identifiers, by location, by site, by facility, by process path, and/or by packing station. The information in the reports may be presented in terms of raw data (e.g., a count of each event being reported), or as a percentage or trend of events being reported, in different embodiments. In other embodiments, other types of packaging performance reports that may be useful in assessing and improving the operations of a materials handling facility may be generated by the package performance analyzer based on the information accessible to the package performance analyzer.

In some embodiments, a shipment splitting analyzer may be a component of a comprehensive packaging information service. Such a service may include additional components configured to provide other functionality to various operations in the materials handling facility. For example, the service may include any or all of the following:

- a box forecasting service, configured to generate a report specifying what containers (e.g., boxes) to erect, and when to erect them, so that they are delivered to shipment assembly at the same time as the items.
- a package type recommender, configured to recommend a packaging type based on shipment weight or product types to reduce damage in shipping. For example, stronger corrugate may be recommended for heavier product or a fragile item may be directed to a box rather than a folder.
- a shipping method recommender, configured to assign shipment methods dependent on box type availability and the resulting cost of shipment.
- a filler recommender, configured to recommend a number of air bags for a container, for example.
- an inbound prepping service, configured to use a container recommendation for prepping of inbound items.
- a packaging system flow analyzer, configured to display a tradeoff in packaging choice versus productivity in real time. For example, if a package choice is optimum, but a corresponding productivity impact negates savings, the analyzer may recommend a choice to be made.
- an automated inventory cycle counter, configured to decrement consumables used in packing/shipping operations. This may reduce manual cycle count errors, and account for wastage.
- a financial analyzer, configured to offer comparison data for supplies cost from container usage reports to manual cycle count usage data.
- a new merchant shipping cost forecaster, configured to determine a real shipping cost impact of new merchant integration to replace fixed estimates.
- a customer container advisor, configured to determine the number of boxes a customer should expect for an order and to display this at checkout.
- a process path recommender, configured to direct particular item packages to process paths in which recommended containers are available.

A shipment splitting analyzer may be further described using the following example. In this example, an e-commerce organization sells items of various types that can be shipped to customers, and a customer may place an order for an arbitrary quantity of each of any number of different items. A customer order may be provided to a materials handling facility intact (e.g., containing all of the items in a given customer order) or may be divided into two or more item packages by a fulfillment planning engine, as described herein. FIGS. 6A-6F illustrate various groupings of items in one such item package, according to one embodiment.

In this example, FIG. 6A illustrates an item package grouping provided to a materials handling facility and comprising fifteen different items. In this example, each of the different items is associated with a respective item identifier 620 (e.g., 620a, 620b . . . 620o) and each item identifier is associated with a respective quantity 630 (e.g., 630a, 630b . . . 630o). In this example, the item package described by the list in FIG. 6A is also associated with an order identifier 600. In various embodiments, this order identifier 600 may represent the original (i.e., complete) customer order and/or an identifier of one item package making up the original customer order. For example, in some embodiments, the order identifier 600 may include two fields: a customer order identifier and an item package (i.e., partial order) identifier. If the item package does not include all of the items of a customer order, other such item package groupings may be provided to other materials handling facilities at the same time or at another time (e.g., if some items are back-ordered).

In the example illustrated in FIGS. 6A-6F, it is assumed that the items shown in FIG. 6A are to be split into multiple shipment sets according to the methods illustrated in FIG. 4, after it has been determined that an attempt to split the item package should be made (e.g., using the method illustrated in FIG. 3, or another suitable method). In this example, the items illustrated in FIG. 6A are sorted according to one or more item parameters, as shown in 410 of FIG. 4 and described above. The sorted item grouping is illustrated in FIG. 6B, and is also associated with order identifier 600 (i.e., the same order identifier associated with the item grouping illustrated in FIG. 6A). Note that in some embodiments, a sorted item package grouping, such as that illustrated in FIG. 6B, may replace an initial item package grouping, such as that illustrated in FIG. 6A, in all subsequent operations in the materials handling facility and/or in an inventory management system thereof, and the original item package grouping may be discarded. In other embodiments, however, such a sorted list may be stored in addition to an original (i.e., unsorted) item package list in the system.

In this example, the items shown in FIG. 6B, in the order shown (i.e., in their sorted order), make up an initial queue from which items will be selected for inclusion in various shipment sets. As shown in FIG. 4, element 430, one item at a time may be selected from this queue (in the order shown) for inclusion in a first shipment set to be shipped in a first target container. As each item is added to the shipment set, the shipment splitting analyzer may determine if the container limits have been reached, as in 440, and may simulate packing the container, returning any items to the queue that will not fit, as in 450. In the example illustrated in FIGS. 6A-6F, it is determined that the first target container is capable of containing the items shown in FIG. 6C. In other words, FIG. 6C illustrates an item grouping for the first shipment set. Note that, in this example, the item grouping illustrated in FIG. 6C is associated with order identifier 600 and also with a shipment identifier 610a. In this example, shipment identifier 610a identifies the first shipment set making up the item package associated with order identifier 600. Note that in some embodiments, a single identifier may be associated with a shipment set, or an identifier of a shipment set may include multiple fields representing an order identifier, an item package identifier, and/or a shipment identifier.

As shown in FIG. 4, the shipment splitting analyzer may repeat the operations illustrated as 430-450, selecting items one at a time (in the order shown) from the queue for a second shipment set and simulating its packing in a second target container. In this example, the item grouping shown in FIG. 6D represents the items that may be contained in the second target container, making up the second shipment set. Note that this item grouping is associated with the order identifier 600 and also with a shipment identifier 610b, identifying the second shipment set. Note also that, in this example, not all of the individual items having item identifier 620o (i.e., copies or instances of item 620o) are able to fit in the second target container. This is illustrated as item quantity 631o, which is less than the quantity 630o included in the original item grouping of FIG. 6A and in the sorted item grouping of FIG. 6B. In this example, only the remaining copies of item 620o remain in the queue after the second shipment set is selected. Two remaining shipment sets, illustrated in FIGS. 6E and 6F, contain only additional quantities of item 620$o$ (e.g., quantities 632$o$ and 633$o$, respectively). Therefore, in the example illustrated in FIGS. 6A-6F, the item package illustrated in FIG. 6A (and again in FIG. 6B) is split into four shipment sets.

Note that, in this example, a target container size and weight capacity are assumed to be specified (or a default target container used) when determining which items will fit together in a shipment set. However, once the actual shipment sets are determined, a box recommender may be invoked to select an appropriate container for each item set. For example, if some items in a shipment set are very heavy, but not very large, a container smaller than the target container may be appropriate for shipping those items. In another example, if the last shipment set making up an item package contains only a few items, a container smaller than the target container may be able to handle those items during shipping. In this example, the four item groupings illustrated in FIGS. 6C-6F may be provided to the materials handling facility and/or may be stored in one or more tables, databases, or other data structures for use by a packaging information system and/or comprehensive inventory management system. In various embodiments, an indication of a recommended container may also be returned with each shipment set and/or associated with each shipment identifier.

The methods used by a packaging information system are not intended to be limited to those described above, and illustrated in FIGS. 3 and 4, and may include any other algorithms suitable for determining if and/or how an item package should be split into multiple shipment sets in a materials handling facility, according to different embodiments. For example, a shipment splitting analyzer may use different parameter values and/or parameter thresholds to determine whether or not an item package should be split, or may use a combination of measured, stored, and estimated data (e.g., data estimated through observation or by an automated product dimension/weight correction function) to determine if and/or how a given item package should be split into multiple shipment sets.

A packaging information system, or stand-alone shipment splitting analyzer, may be implemented within the facility in one or more software modules executing on one or more nodes of a computing system (e.g., as program instructions and data structures configured to implement functionality described), or in any combination of hardware and software components suitable for implementing the functionality described. It may be configured to receive inputs from other software applications, agents working in the facility or remotely, and/or automated systems within the facility (e.g., scanners, sensors, automated storing, picking, or packing equipment, or software applications managing one or more local or remote data stores.) For example, when an item package is placed in a container for shipping, a container identifier (e.g., a bar code) and an item package identifier may automatically be scanned, or these identifiers may be input by a packing agent using a terminal or other suitable input device. In addition, an identifier of the packing station and/or agent responsible for packing the item package for shipping may be automatically captured or manually input. Any or all of this information, along with other information received from and/or stored by other operations in the materials handling facility may serve as inputs to the packaging information system.

Figure 7:
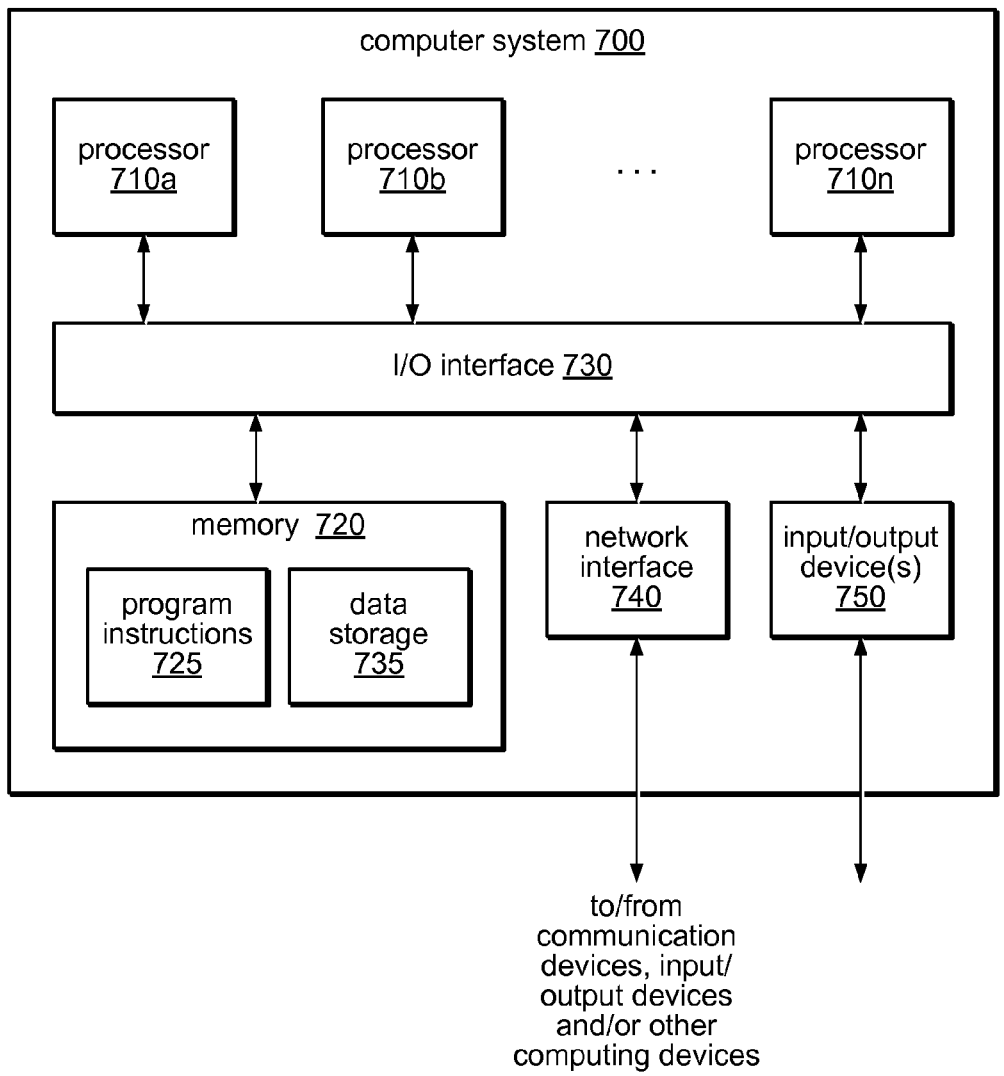
FIG. 7 is a block diagram illustrating an exemplary embodiment of a computer system suitable for implementing a shipment splitting service.

Shipment splitting analysis and/or a packaging information system, as described herein, may be executed on one or more computer systems, interacting with various other devices in a materials handling facility, according to various embodiments. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750. In some embodiments, it is contemplated that automated shipment splitting analysis and/or other components of a packaging information system may be implemented using a single instance of computer system 700, while in other embodiments multiple such systems, or multiple nodes making up computer system 700, may be configured to host different portions or instances of automated shipment splitting analysis and/or a packaging information system. For example, in one embodiment some data sources or services (e.g., capturing container information for a shipment set) may be implemented via one or more nodes of computer system 700 that are distinct from those nodes implementing other data sources or services (e.g., recommending a container for an item package). In some embodiments, a given node may implement the functionality of more than one component of automated shipment splitting analysis and/or a packaging information system.

In various embodiments computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement automated shipment splitting analysis and/or a packaging information system, and data storage 735, comprising various tables, databases and/or other data structures accessible by program instructions 725. In one embodiment, program instructions 725 may include various software modules configured to implement a shipment splitting analyzer, such as that described in conjunction with FIGS. 3-4 and/or a packaging information system, as described in conjunction with FIG. 5, which may include a box recommender (such as container recommender 540 described above) and/or a package performance analyzer. It may also include program instructions suitable for interacting with data store 500 (e.g., to store and/or retrieve data from the data store) and/or report console 525. In various embodiments, program instructions 725 may include software modules configured to implement any of the functionality described herein for comprehensive packaging information system.

As noted above, data storage 735 may include one or more tables, databases, or other data structures used for storing and retrieving various parameter values used in conjunction with the system and methods described herein. For example, data storage 735 may include various data stores for maintaining item parameter values, container parameter values, item package information (such as that illustrated in FIGS. 6A-6F), facility configuration information, customer preference information, order information, and various reports produced by the shipment splitting analyzer and/or other components of a packaging information system. Item parameter values may include an identifier, a weight, a volume, a length, a height, a width, a suspect dimensions count, or a confidence level value, as well as item names, quantities, descriptions, pricing, cost, or any other information that may be included in a product catalog, inventory management system, or other representation of the items in the materials handling facility, in various embodiments. Container parameters may include container identifiers, names, and dimensions, as well as weight, weight capacity, color, composition, quantity, supplier name, or any other information about containers that may be useful to the various operations of the materials handling facility. In various embodiments, item package information may also include information about containers used in shipping each item package and/or shipment set therefore, and may also include recommended containers for each item package and/or shipment set. In various embodiments, any or all of the data and/or tables described herein may be included data storage 735.

In various embodiments, the parameter values and other data illustrated herein as being included in one or more data stores may be combined with other information not described or may be partitioned differently into more, fewer, or different data structures. In some embodiments, data stores used in automated shipment splitting analysis and/or in a packaging information system, or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments. Similarly, in other embodiments, different software modules and data stores may make up an automated shipment splitting analyzer and/or a packaging information system.

Users may interact with the shipment splitting analyzer and/or packaging information system in various ways in different embodiments, such as to automatically measure and/or manually specify measured dimension values for items and/or packaging, to specify thresholds to be used when determining whether to split a shipment, or to specify reports to be generated and/or report parameters. For example, some users may have physical access to computing system 700, and if so may interact with various input/output devices 750 (e.g., report console 525) to provide and/or receive information. Alternatively, other users may use client computing systems to access the product dimension correction system and/or package performance analyzer, such as remotely via network interface 740 (e.g., via the Internet and/or the World Wide Web). In addition, some, or all, of the shipment splitting analyzer and/or packaging information system components may provide various feedback or other general types of information to users (e.g., in response to user requests) via one or more input/output devices 750.

Those skilled in the art will appreciate that computing system 700 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing system 700 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, different embodiments may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as illustrated in the figures and described herein represent exemplary embodiments of methods. The methods may be implemented in software, in hardware, or in a combination thereof in other embodiments. Similarly, the order of any method may be changed, and various elements may be added, reordered, combined, omitted, modified, etc., in other embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer accessible storage medium, other aspects may likewise be so embodied.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A computing system, comprising:
   one or more computers;
   wherein the one or more computers are configured to implement:
   a data store storing packaging-related information; and
   a shipment splitting analyzer configured to:
   receive data identifying a group of items to be shipped to a same destination from a materials handling facility, wherein the data comprises two or more unique item identifiers and a respective quantity of items associated with each unique item identifier, and wherein at least two items in the group of items have different sizes or shapes;
   compare one or more of a number of unique item identifiers in the data identifying the group of items or a number of items in the group of items to a respective pre-determined threshold condition;
   in response to the comparison resulting in meeting the pre-determined threshold condition:
   attempt to split the group of items into two or more shipment sets, wherein in attempt to split the group of items into two or more shipment sets, the shipment splitting analyzer is configured to:
   access a portion of the packaging-related information in the data store;
   attempt to divide the group of items into two or more shipment sets dependent, at least in part, on the accessed packaging-related information; and
   provide data identifying each of one or more shipment sets to the materials handling facility dependent on results of said attempt to divide the group of items, wherein each shipment set comprises items to be packaged together for shipment in a respective container;
   wherein said providing is performed prior to the group of items being sorted for shipping; and
   in response to the comparison resulting in not meeting the pre-determined threshold condition:
   refrain from attempting to split the group of items into two or more shipment sets; and
   provide data to the materials handling facility identifying the group of items as a single shipment set.

2. The computing system of claim 1, wherein the packaging-related information comprises dimensions of each of the items in the group of items and dimensions of one or more containers, and wherein said attempting to divide the group of items comprises determining which items in the group of items will fit in one of the one or more containers.

3. The computing system of claim 2, wherein the packaging-related information further comprises a weight of each of the items in the group of items and a weight limit for each of the one or more containers, and wherein said attempting to divide the group of items further comprises determining whether the items determined to fit in the one of the one or more containers can be collectively handled in the one of the one or more containers within its weight limit.

4. The computing system of claim 1, wherein the packaging-related information comprises a weight of each of the items in the group of items and a weight limit for one or more containers, and wherein said attempting to divide the group of items comprises determining which items in the group of items can be collectively handled in one of the one or more containers within its weight limit.

5. The computing system of claim 4, wherein the packaging-related information further comprises dimensions of each of the items in the group of items and dimensions of each of the one or more containers, and wherein said attempting to divide the group of items further comprises determining whether the items determined to meet the weight limit of the one of the one or more containers will fit in the one of the one or more containers.

6. The computing system of claim 1, wherein the packaging-related information comprises affinity information for at least one of the items in the group of items, wherein the affinity information comprises information indicating one or more other items that should not be handled in the same container as the at least one of the items or information indicating one or more other items that are required to be shipped together with the at least one of the items, and wherein said attempting to divide the group of items comprises determining which items should be handled together in one of the one or more containers dependent on the affinity information.

7. The computing system of claim 1, wherein said attempting to divide the group of items comprises:
dequeuing one of the items in the group of items into a proposed shipment set pool;
determining one or more of a cumulative volume of the items in the proposed shipment set pool or a cumulative weight of the items in the proposed shipment set pool; and
repeating said dequeuing and said determining until one or more of a size limit or a weight limit of a target container is reached.

8. The computing system of claim 7, wherein said attempting to divide the group of items further comprises sorting the group of items by one or more of: item identifier, item quantity, size, weight, affinity, or product line, prior to said dequeuing, and wherein said dequeuing one of the items in the group of items comprises dequeuing a next item from the group of items in its sorted order.

9. The computing system of claim 7, wherein said attempting to divide the group of items further comprises:
determining whether the items in the proposed shipment set pool can be collectively handled in the target container dependent on both their sizes and weights;
returning one or more items of the proposed shipment set pool to the group of items in response to determining that not all of the items in the proposed shipment set pool can be collectively handled in the target container; and
associating the items remaining in the proposed shipment set pool with a first shipment set.

10. The computing system of claim 7, wherein said dequeuing is repeated for each of one or more other proposed shipment set pools and respective target containers until all the items in the group of items have been associated with one of the two or more shipment sets.

11. The computing system of claim 7, wherein the target container is a largest available container in the materials handling facility.

12. The computing system of claim 7, wherein the target container is a container selected by the shipment splitting analyzer from a plurality of containers available in the materials facility dependent on one or more of: a product line, a transportation method constraint, or a destination-specific size or weight constraint.

13. The computing system of claim 1, wherein the packaging-related information comprises shipping cost information, and wherein said attempting to divide the group of items comprises:
determining a shipping cost for each of the one or more shipment sets;
attempting to divide the group of items into two or more different shipment sets; and
determining whether the one or more shipment sets or the two or more different shipment sets results in a lower total shipping cost for the group of items.

14. The computing system of claim 1, wherein said attempting to divide the group of items comprise:
recommending a container for each of the one or more shipment sets; and
providing an indication of the recommended container to the materials handling facility.

15. The computing system of claim 1, wherein the shipment splitting analyzer is further configured to select a recommended container for each of the one or more shipment sets.

16. The computing system of claim 1, wherein the predetermined threshold condition defines a number of unique item identifiers below which an attempt to split the group of items into two or more shipment sets should be made, a number of unique item identifiers above which an attempt to split the group of items into two or more shipment sets should be made, a quantity of a single item in the group of items, a total quantity of items in the group of items, or a ratio between a number of unique item identifiers and a number of items in the group of items.

17. The computing system of claim 1, wherein the shipment splitting analyzer is further configured to remove one or more items from the group of items for exception handling prior to said attempting to divide the group of items dependent, at least in part, on the accessed packaging-related information.

18. The computing system of claim 1, wherein the shipment splitting analyzer is configured to return the data identifying the group of items as data identifying a single shipment set in response to a failure of said attempt to divide the group of items into two or more shipment sets.

19. The computing system of claim 1, wherein the shipment splitting analyzer is configured to return the data identifying the group of items as data identifying a single shipment set and to flag the group of items for exception handling in response to said attempt to divide the group of items resulting in a number of shipment sets greater than a predetermined maximum number of shipment sets.

20. The computing system of claim 1, wherein the shipment splitting analyzer is further configured to:
store the data identifying each of the one or more shipment sets in the data store; and
analyze at least a portion of the data stored in the data store to produce a report comprising one or more of: a number or percentage of groups of items split into two or more shipment sets, a trend in the number of groups of items split into two or more shipment sets, a number or average number of items in each shipment set, a number or percentage of groups of items requiring exception handling for shipment splitting, a number or percentage of groups of items shipped as whole or partial palettes, or performance of the shipment splitting analyzer expressed in terms of speed, amount of rework, or a number or percentage of transportation schedules met for a plurality of shipment sets.

21. A method, comprising:
performing by one or more computers all of the following actions:
receiving data identifying a group of items to be shipped to a same destination from a materials handling facility, wherein the data comprises two or more unique item identifiers and a respective quantity of items associated with each unique item identifier, and wherein at least two items in the group of items have different sizes or shapes;

comparing one or more of a number of unique item identifiers in the data identifying the group of items or a number of items in the group of items to a respective pre-determined threshold condition;

in response to the comparing resulting in meeting the pre-determined threshold condition:
attempting to split the group of items into two or more shipment sets, wherein said attempting comprises:
accessing packaging-related information in a data store storing packaging-related information;
attempting to divide the group of items into two or more shipment sets dependent, at least in part, on the accessed packaging-related information; and
providing data identifying each of one or more shipment sets to the materials handling facility dependent on results of said attempting to divide the group of items, wherein each shipment set comprises items to be packaged together for shipment in a respective container;
wherein said providing is performed prior to the group of items being sorted for shipping; and receiving data identifying another group of items to be shipped to a same destination from the materials handling facility;

comparing one or more of a number of unique item identifiers in the data identifying the other group of items or a number of items in the other group of items to a respective pre-determined threshold condition; and in response to the comparing for the other group of items resulting in not meeting the pre-determined threshold condition:
refraining from attempting to split the other group of items into two or more shipment sets; and
providing to the materials handling facility data identifying the other group of items as a single shipment set.

22. The method of claim 21, wherein the packaging-related information comprises dimensions of each of the items in the group of items and dimensions of one or more containers, and wherein said attempting to divide the group of items comprises determining which items in the group of items will fit in one of the one or more containers.

23. The method of claim 21, wherein the packaging-related information comprises a weight of each of the items in the group of items and a weight limit for one or more containers, and wherein said attempting to divide the group of items comprises determining which items in the group of items can be collectively handled in one of the one or more containers within its weight limit.

24. The method of claim 21, wherein the packaging-related information comprises affinity information for at least one of the items in the group of items, wherein the affinity information comprises information indicating one or more other items that should not be handled in the same container as the at least one of the items or information indicating one or more other items that are required to be shipped together with the at least one of the items, and wherein said attempting to divide the group of items comprises determining which items should be handled together in one of the one or more containers dependent on the affinity information.

25. The method of claim 21, wherein said attempting to divide the group of items comprises:
dequeuing one of the items in the group of items into a proposed shipment set pool;
determining one or more of a cumulative volume of the items in the proposed shipment set pool or a cumulative weight of the items in the proposed shipment set pool; and
repeating said dequeuing and said determining until one or more of a size limit or a weight limit of a target container is reached.

26. The method of claim 25, wherein said attempting to divide the group of items further comprises:
determining whether the items in the proposed shipment set pool can be collectively handled in the target container dependent on both their sizes and weights;
returning one or more items of the proposed shipment set pool to the group of items in response to determining that not all of the items in the proposed shipment set pool can be collectively handled in the target container; and
associating the items remaining in the proposed shipment set pool with a first shipment set.

27. The method of claim 25, wherein said dequeuing is repeated for each of one or more other proposed shipment set pools and respective target containers until all the items in the group of items have been associated with one of the two or more shipment sets.

28. The method of claim 21, wherein said attempting to divide the group of items comprises determining a target container for each of the two or more shipment sets, and wherein said determining a target container comprises selecting a largest available container in the materials handling facility or selecting a container from a plurality of containers available in the materials facility dependent on one or more of: a product line, a transportation method constraint, or a destination-specific size or weight constraint.

29. The method of claim 21, further comprising:
recommending a container for each of the one or more shipment sets; and
providing an indication of the recommended container to the materials handling facility.

30. The method of claim 21, wherein the pre-determined threshold condition defines a number of unique item identifiers below which an attempt to split the group of items into two or more shipment sets should be made, a number of unique item identifiers above which an attempt to split the group of items into two or more shipment sets should be made, a quantity of a single item in the group of items, a total quantity of items in the group of items, or a ratio between a number of unique item identifiers and a number of items in the group of items.

31. The method of claim 21, further comprising removing one or more items from the group of items for exception handling prior to said attempting to divide the group of items dependent, at least in part, on the accessed packaging-related information.

32. The method of claim 21, further comprising:
storing the data identifying each of the one or more shipment sets in the data store; and
analyzing at least a portion of the data stored in the data store to produce a report comprising one or more of: a number or percentage of groups of items split into two or more shipment sets, a trend in the number of groups of items split into two or more shipment sets, a number or average number of items in each shipment set, a number or percentage of groups of items requiring exception handling for shipment splitting, a number or percentage of groups of items shipped as whole or partial palettes, a speed of a shipment splitting operation, an amount of rework, or a number or percentage of transportation schedules met for a plurality of shipment sets.

33. A non-transitory, computer-readable storage medium storing program instructions which, upon execution by a computer, cause the computer to implement actions comprising:

receiving data identifying a group of items to be shipped to a same destination from a materials handling facility, wherein the data comprises two or more unique item identifiers and a respective quantity of items associated with each unique item identifier, and wherein at least two items in the group of items have different sizes or shapes;

comparing one or more of a number of unique item identifiers in the data identifying the group of items or a number of items in the group of items to a respective pre-determined threshold condition;

in response to the comparing resulting in meeting the pre-determined threshold condition:
attempting to split the group of items into two or more shipment sets, wherein said attempting comprises:
accessing packaging-related information in a data store storing packaging-related information;
attempting to divide the group of items into two or more shipment sets dependent, at least in part, on the accessed packaging-related information; and
providing data identifying each of one or more shipment sets to the materials handling facility dependent on results of said attempting to divide the group of items, wherein each shipment set comprises items to be packaged together for shipment in a respective container;
wherein said providing is performed prior to the group of items being sorted for shipping; and in response to the comparing resulting in not meeting the pre-determined threshold condition:
refraining from attempting to split the group of items into two or more shipment sets; and
providing data to the materials handling facility identifying the group of items as a single shipment set.

34. The non-transitory, computer-readable storage medium of claim 33, wherein the packaging-related information comprises one or more of: dimensions of each of the items in the group of items, dimensions of one or more containers, a weight of each of the items in the group of items, or a weight limit for one or more containers.

35. The non-transitory, computer-readable storage medium of claim 33, wherein said attempting to divide the group of items comprises:
dequeuing one of the items in the group of items into a proposed shipment set pool;
determining one or more of a cumulative volume of the items in the proposed shipment set pool or a cumulative weight of the items in the proposed shipment set pool; and repeating said dequeuing and said determining until one or more of a size limit or a weight limit of a target container is reached.

36. The non-transitory, computer-readable storage medium of claim 35, wherein said attempting to divide the group of items further comprises:
determining whether the items in the proposed shipment set pool can be collectively handled in the target container dependent on both their sizes and weights;
returning one or more items of the proposed shipment set pool to the group of items in response to determining that not all of the items in the proposed shipment set pool can be collectively handled in the target container; and
associating the items remaining in the proposed shipment set pool with a first shipment set.

37. The non-transitory, computer-readable storage medium of claim 35, wherein said dequeuing is repeated for each of one or more other proposed shipment set pools and respective target containers until all the items in the group of items have been associated with one of the two or more shipment sets.

38. The non-transitory, computer-readable storage medium of claim 33, wherein said attempting to divide the group of items comprises determining a target container for each of the two or more shipment sets, and wherein said determining a target container comprises selecting a largest available container in the materials handling facility or selecting a container from a plurality of containers available in the materials facility dependent on one or more of: a product line, a transportation method constraint, or a destination-specific size or weight constraint.

39. The non-transitory, computer-readable storage medium of claim 33, wherein the program instructions are further executable to implement removing one or more items from the group of items for exception handling prior to said attempting to divide the group of items dependent, at least in part, on the accessed packaging-related information.

40. The non-transitory, computer-readable storage medium of claim 33, wherein the program instructions are further executable to implement:
storing the data identifying each of the one or more shipment sets in the data store; and
analyzing at least a portion of the data stored in the data store to produce a report comprising one or more of: a number or percentage of groups of items split into two or more shipment sets, a trend in the number of groups of items split into two or more shipment sets, a number or average number of items in each shipment set, a number or percentage of groups of items requiring exception handling for shipment splitting, a number or percentage of groups of items shipped as whole or partial palettes, a speed of a shipment splitting operation, an amount of rework, or a number or percentage of transportation schedules met for a plurality of shipment sets.

* * * * *